United States Patent [19]

Wagner

[11] 4,213,723
[45] Jul. 22, 1980

[54] THREAD CUTTING DIE STOCK

[75] Inventor: Rudolf Wagner, Waiblingen, Fed. Rep. of Germany

[73] Assignee: Rems-Werk Christian Föll und Söhne GmbH & Co., Waiblingen, Fed. Rep. of Germany

[21] Appl. No.: 867,765

[22] Filed: Jan. 9, 1978

[30] Foreign Application Priority Data

Jan. 7, 1977 [DE] Fed. Rep. of Germany ....... 2700465

[51] Int. Cl.² .......................... B23B 45/12; B23G 1/30
[52] U.S. Cl. ................................. 408/239 A; 408/123
[58] Field of Search .................. 408/221, 239 R, 120, 408/123, 239 A

[56] References Cited

U.S. PATENT DOCUMENTS

| 1,752,915 | 4/1930 | Lilleberg | 408/123 |
|---|---|---|---|
| 2,004,639 | 6/1935 | Thewes | 408/123 |
| 2,145,762 | 1/1939 | Fox | 408/123 |
| 2,255,009 | 9/1941 | Ingwer | 408/123 |
| 2,269,221 | 1/1942 | Pealer | 408/123 |
| 2,388,290 | 11/1945 | Roper | 408/239 |

Primary Examiner—Leonidas Vlachos
Attorney, Agent, or Firm—Becker & Becker, Inc.

[57] ABSTRACT

A thread cutting die stock with a die stock head structure which has a first inner guiding surface for detachably receiving the shank of a first cutting head while radially inwardly of the aforementioned first guiding surface there is detachably arranged an adaptor having a second inner guiding surface for detachably receiving therein the shank of a second cutting head of smaller cutting size than that of the first cutting head, thereby making it possible by merely inserting or removing the adaptor to modify the die stock from receiving a larger sized thread cutting head to a smaller sized thread cutting head and vice versa.

4 Claims, 7 Drawing Figures

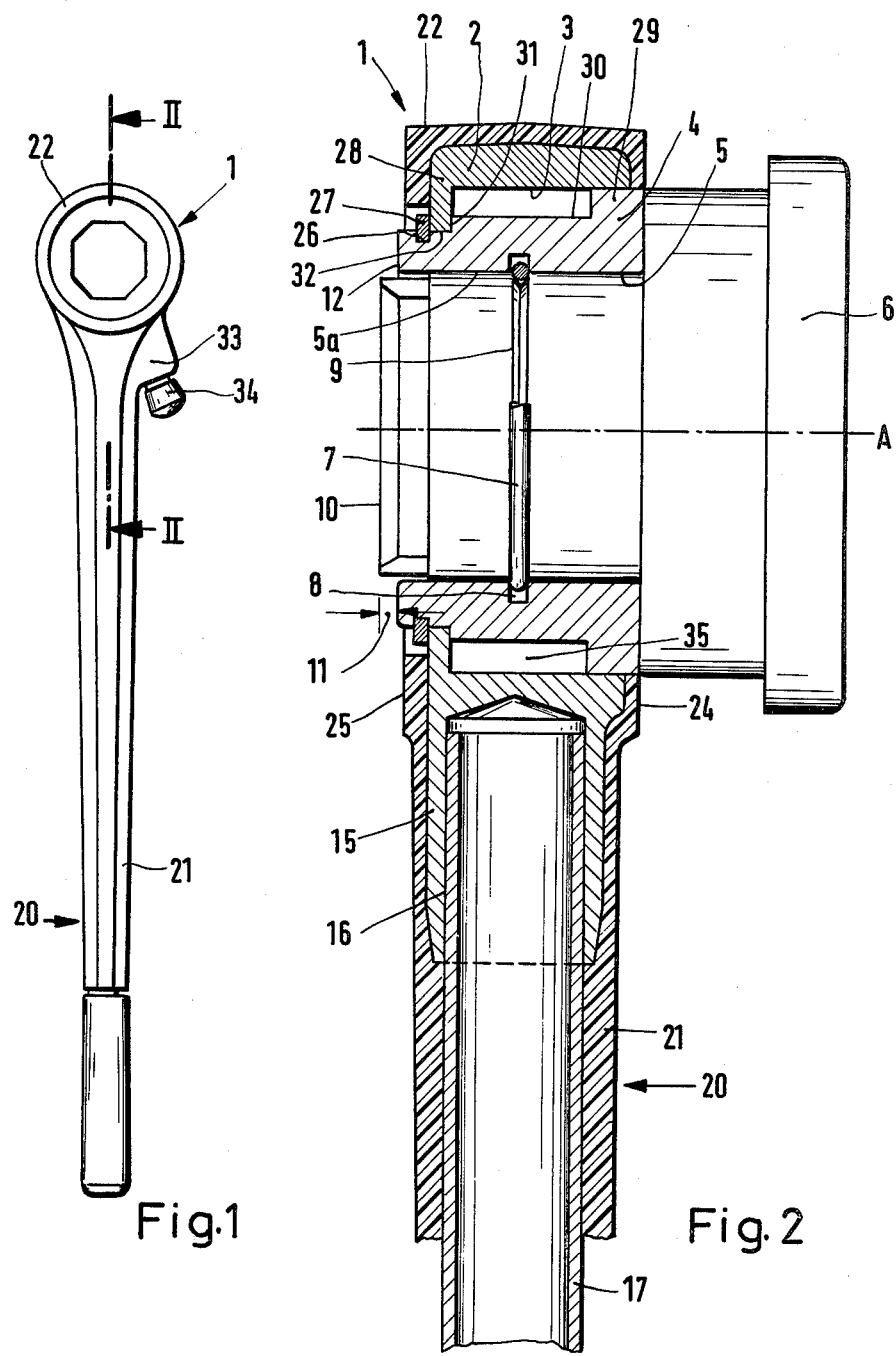

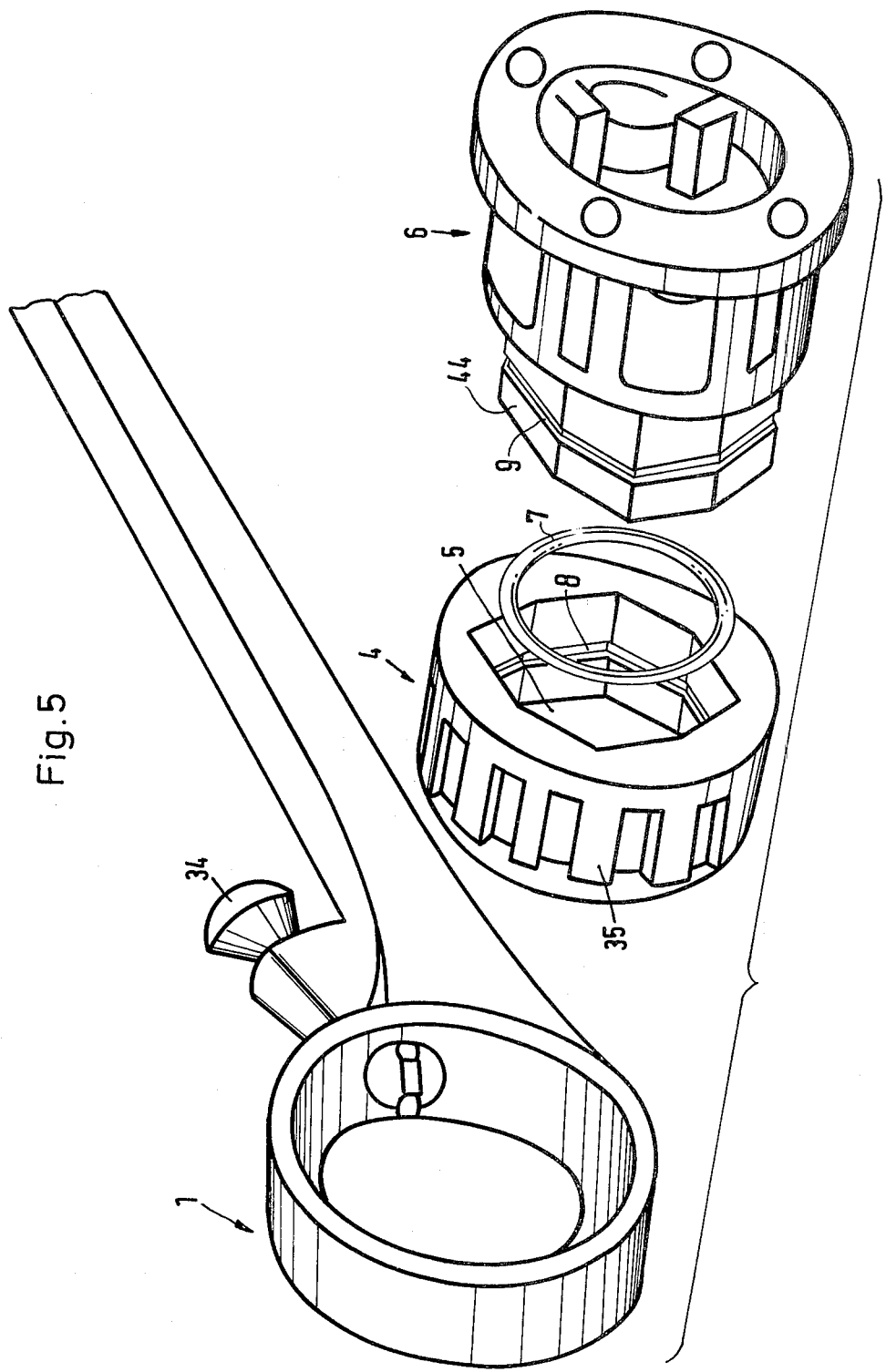

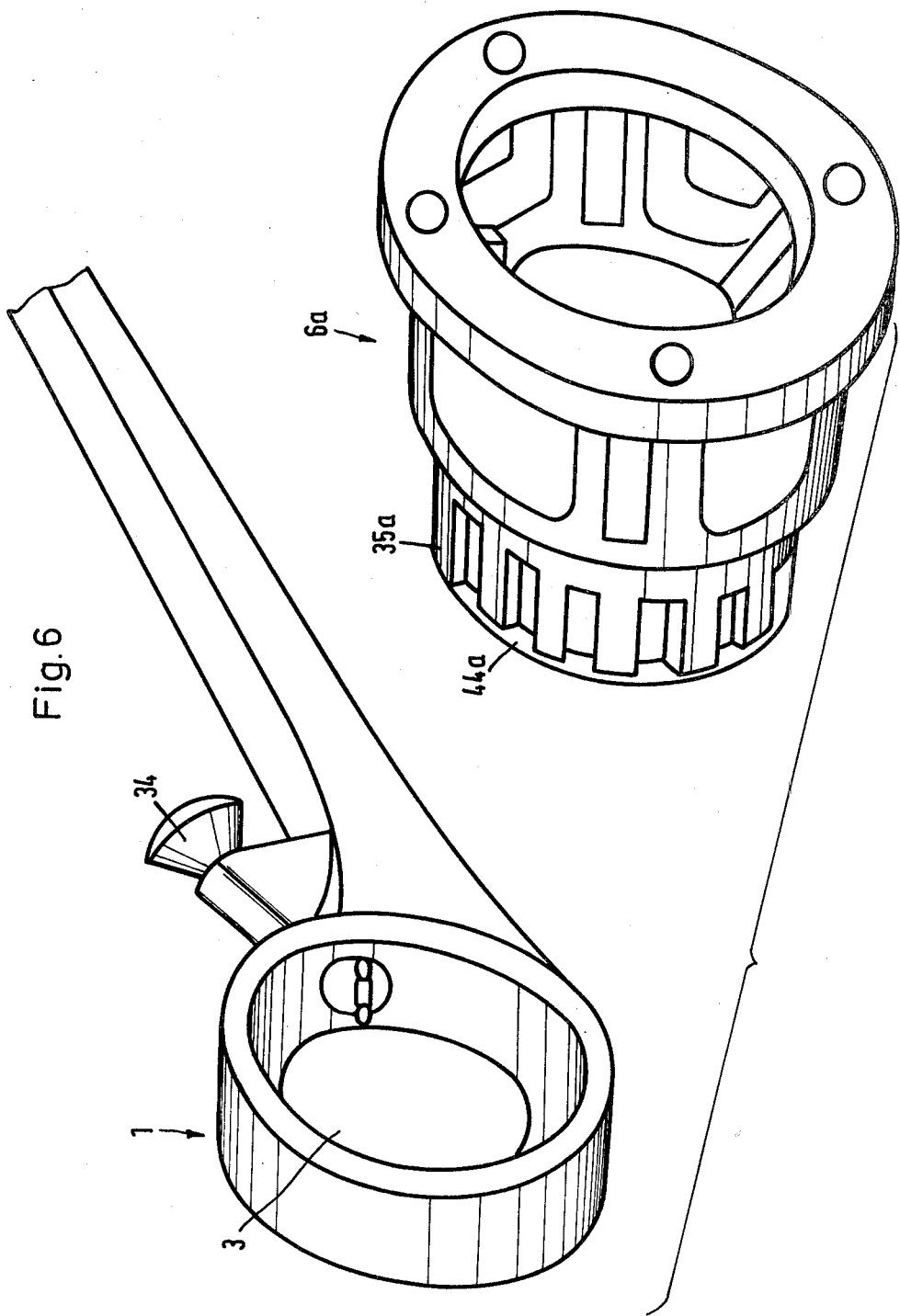

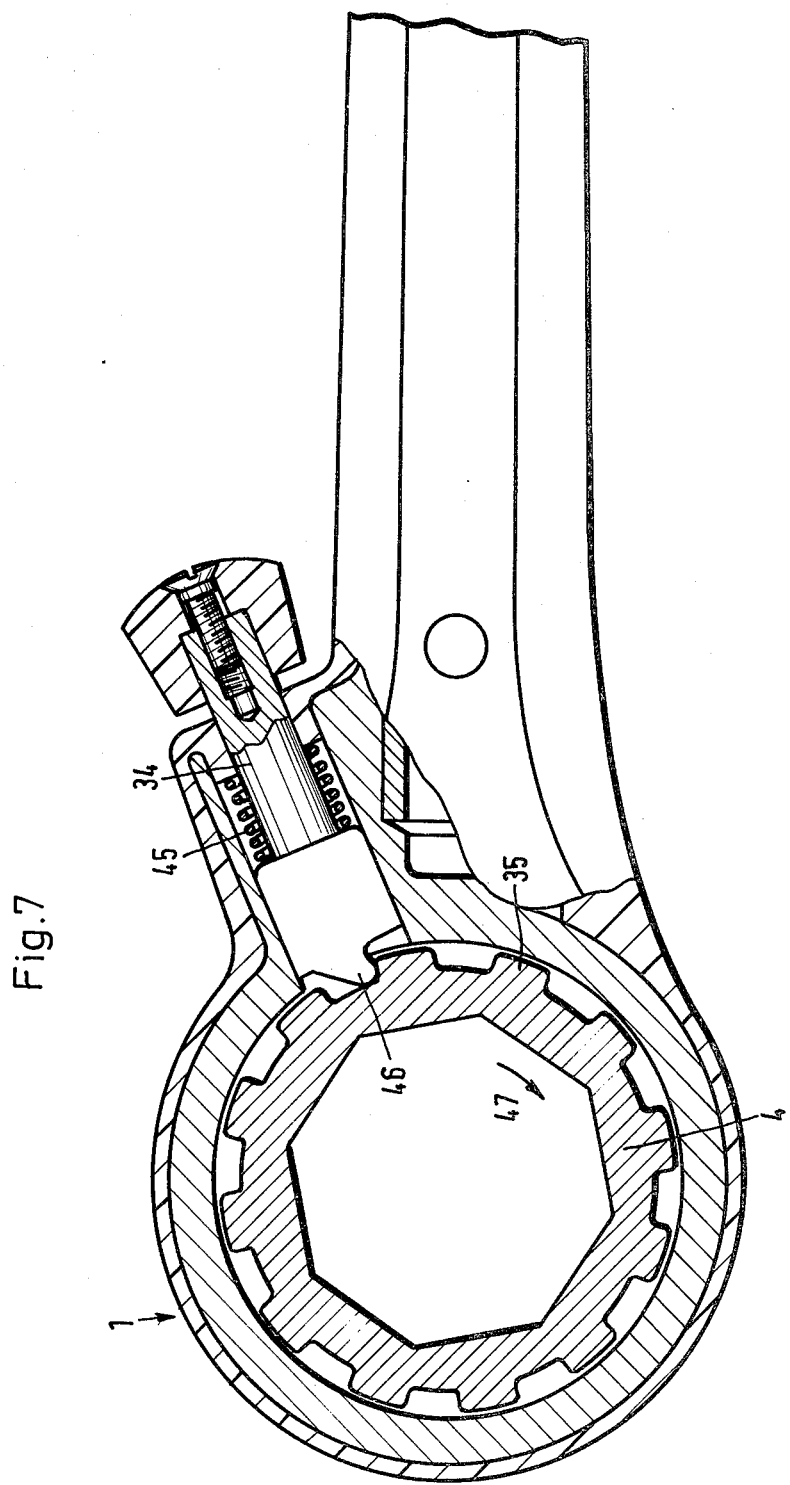

THREAD CUTTING DIE STOCK

The present invention relates to a thread cutting die stock having a die stock head and a catch ring for receiving an exchangeable cutting head arranged in its head ring and having a die stock arm projecting at least approximately radially from the die stock head.

With a known thread cutting die stock of this type the cutting heads are inserted in a catch ring which is held positively locked in the head ring. The exchangeable cutting heads have a size up to one inch, to one and a quarter inches or to two inches. The size of the die stock head is correspondingly up to one inch, to one and a quarter inches, or two inches. The size up to one and a quarter inches is the most usual, as up to this size most threads are cut manually. If a thread cutting head of one and one half inches or two inches is required, a correspondingly larger die stock head is necessary, so that the one and one half inch and two inch tube can be guided through or inserted in the thread cutting head.

It is usual to use a die stock head having a die stock arm and of which the die stock head can take thread cutting heads up to, for example, two inches. When using smaller thread cutting heads, such thread cutting die stocks are unwieldy and have a considerable weight, so that working with such thread cutting die stocks is rendered difficult. It is, however, possible for larger cutting heads to use alternative thread cutting die stocks which are suitable for larger cutting heads but unsuitable for smaller cutting heads, for example, of sizes from one quarter to one and a quarter inches. This, however, has the drawback that two kinds of die stock heads for the more common sizes of cutting heads must be kept in stock whereby the stock-keeping costs are increased and the necessary storage space increased.

The invention is based on the problem of designing a thread cutting die stock such that, for exchangeable thread cutting heads which are usually up to one inch, one and a quarter or two inches, only a single die stock head is necessary.

This problem is solved, according to the invention, in that the head ring of the die stock head is designed for the direct positive holding of exchangeable cutting heads.

In consequence of the design according to the invention, without increasing the size of the die stock head, smaller and larger cutting heads can be accommodated. Should cutting heads with a usual size up to, for example, one and one quarter inches be used, a catch ring which takes the cutting heads is fixed in the die stock head. If work is to be done with larger cutting heads having, for example, a size of one and one half inches or two inches, the catch ring is removed from the head ring and the larger cutting head is applied directly to the head ring where it is positively held. In this way it is possible, while maintaining a size of the head ring necessary for the usual cutting head size up to one and one quarter inches, to accommodate in the die stock head larger cutting heads up to one and one half inches and two inches. Thereby, only one kind of thread cutting die stock need be kept in stock. The thread cutting die stock according to the invention may be kept small and light in weight, whereby with its threads of one and one half inches and two inches, as well as smaller threads up to one and one quarter inches can easily be cut.

The invention will now be described further, by way of example only, with reference to the accompanying drawings illustrating two embodiments thereof and in which:

FIG. 1 is a plan view of a thread cutting die stock constructed in accordance with the invention.

FIG. 2 shows an enlarged section taken on line II—II of FIG. 1, the die stock head of the thread cutting die stock having a cutting head mounted in position by means of a catch ring.

FIG. 5 shows an exploded view of an inventive thread cutting die stock with the catch ring and cutting head according to FIG. 2.

FIG. 6 shows an exploded view of the thread cutting die stock and the larger cutting head according to FIG. 4 which is inserted directly in the die stock head without any catch ring.

FIG. 7 shows a radial section through the die stock head with an inserted catch ring.

Figure 3:
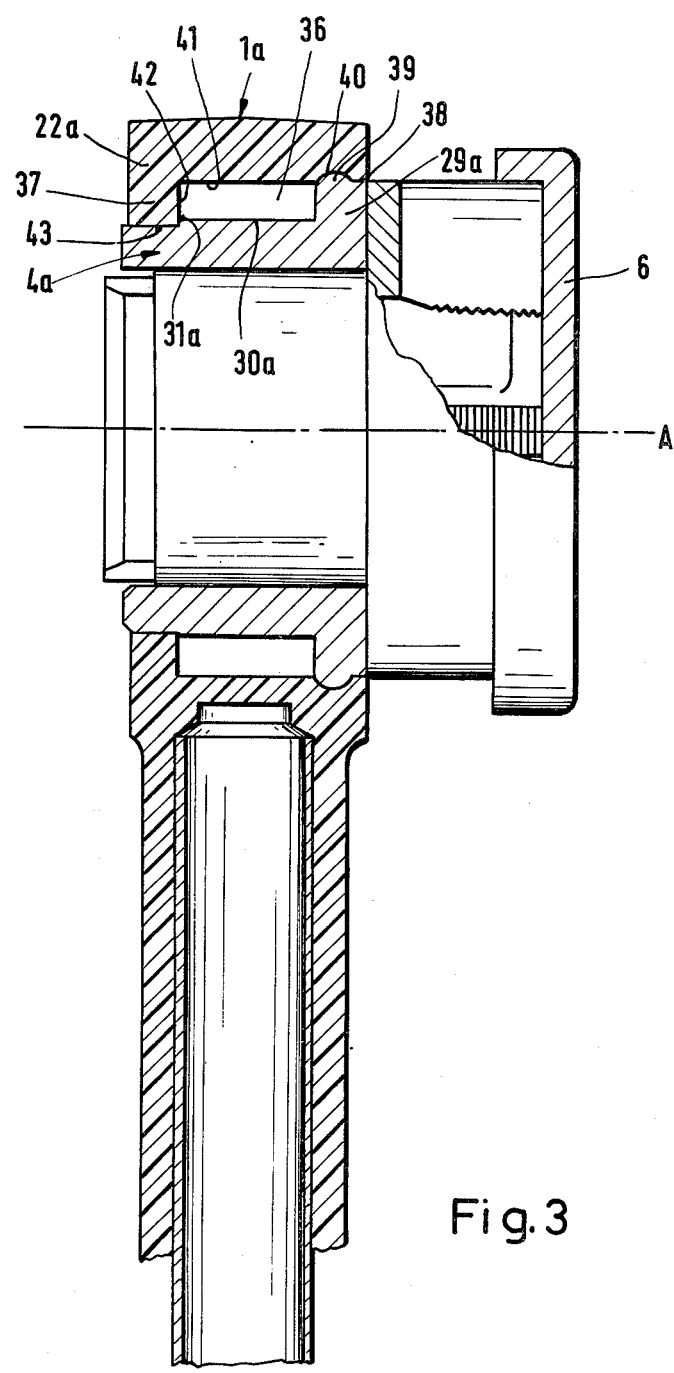
FIG. 3 is a view corresponding to FIG. 2 and shows an alternative embodiment of a thread cutting die stock according to the invention.

The thread cutting die stock shown in FIGS. 1 and 2 has a die stock head 1 within which a head ring 2, for example of cast steel, is arranged. The head ring 2 has a bore 3 to receive a catch ring or adaptor 4 with a central bore 5 for receiving a cutting head 6 in conventional manner. The cutting head 6 is removable and may be replaced by another cutting head for a different thread. A securing means, for example a snap ring 7, lies in a groove 8 at the inner face 5a of the circular catch ring or adaptor 4, the diameter of the snap ring 7 being such that the ring projects from the groove 8 into the receiving bore 5 of the catch ring 4. When inserting the cutting head 6 into the bore 5 of the catch ring 4, the snap ring 7 is pressed wholly into the groove 8. When the cutting head has reached its position shown in FIG. 2, the snap ring 7 snaps partially into a groove 9 provided in the surface of the cutting head 6 and thereby secures the cutting head in axial direction of the catch ring 4. In its fully engaged position the end section 10 of the cutting head 6 projects beyond the end face 12 of the catch ring 4 by a distance 11.

The groove 9 in the outer periphery of the cutting head 6 is so designed that, when the projecting end section 10 of the thread cutting head strikes a non-yielding surface, the snap ring 7 is pushed radially outwardly into the groove 8 in the catch ring 4 and thereby releases the cutting head 6.

A die stock arm, generally designated 20, projects approximately radially from the head ring 2, such arm comprising a tube 17 engaged with the bore 16 of a lug 15 formed integrally with and radially of the common axis A of the receiving bore 3 and the bore 9 of the catch ring 4. The die stock arm 20 serves to facilitate the application of the cutting head 6 of the torque necessary for thread cutting. The length of the tube 17 is several times the outer diameter of the die stock head 1.

Die stock arm 20 is provided with a covering 21, preferably of polyethylene, which is injection molded about tube 17 and lug 15. The covering 21 connects with a plastic covering 22 which is designed preferably in one piece with the covering 21 and is produced in the same working procedure and one and the same injection mold. The plastic covering 22 extends about the periphery of head ring 2 and over narrow edge zones 24 and 25 of its front and rear faces.

The head ring 2 has a radially inwardly directed lip or extension 28 at the rear end thereof, such lip constituting a holding member for the catch ring 4 to be inserted. The lip 28 projects beyond the limit of the plastic covering 22, as can be seen from FIG. 2. The end of the catch ring 4 remote from the cutting head 6 is stepped to provide a peripheral shoulder 31 in its outer wall 30, the shoulder 31 abutting the lip 28 on full engagement of the catch ring with the head ring. The inner peripheral face 32 of the lip 28 lies on the reduced diameter part of the stepped end region of the catch ring. The opposite end of the catch ring has a radially outwardly directed flange or collar 29 which bears against the receiving bore 3 of the head ring 2 and supports the catch ring therein.

The catch ring 4 is secured in the receiving bore 3 of the head ring 2 by means of a snap ring 27 which engages in a peripheral groove 26 in the stepped end region of the outer wall 30 of the catch ring 4 and contacts the outer face of the lip 28.

The catch ring 4 is secured against axial displacement by means of the shoulder 31 and the snap ring 27.

By using the catch ring 4, cutting heads of a size of, for example, up to one and one quarter inches may be held in the die stock head 1. Usually such cutting heads are used up to a size of one and one quarter inches in order to cut threads manually. If a larger cutting head 6a is to be used according to FIG. 4, catch ring 4 and cutting head 6 (FIG. 2) are removed from the head ring 2 by striking the projecting end piece 10 of the cutting head 6 on a substantially nonyielding surface so that the snap ring 7 is displaced into the groove 8 of the catch ring 4 thereby releasing the cutting head 6. Snap ring 27 is then removed so that the catch ring 4 can be removed from the end ring 2. A larger cutting head 6a is then introduced into the receiving bore 3 of the head ring 2 without employing the catch ring 4. The receiving bore 3 is so shaped that the larger cutting head 6a with its extension 6b bears against the inner wall of bore 3. To this end, extension 6b is provided with a collar 29a. For axially securing the cutting head in the receiving bore 3, the front end section of such cutting head is provided with a peripheral shoulder 31a. The angled-off lip 28 of the head ring 2 bears against the radial surface of said shoulder 31a. Thus, the shoulder 31a of the larger cutting head 6a is of the same or similar design as the shoulder 31 of catch ring 4 of the embodiment of FIG. 1. The outer mantle surface of the larger cutting head is likewise provided with a circular groove 26a into which the snap ring 27 can be inserted for axially securing the cutting head 6a.

For purposes of detaching the snap ring 27, the end face of the extension 6b is provided with a slot 13. Thus, in one and the same die stock head small cutting heads can be mounted by means of a catch ring or large cutting heads can be mounted without a catch ring. Thereby a compact design of the die stock head is insured which is advantageous.

As FIG. 1 shows, in the region of the transition from the covering 21 to the plastic covering 22 an eye 33 is provided, having arranged therein a longitudinally adjustable, spring-loaded locking bolt 34 which, in its locking position, engages an outer set of teeth 35 (FIG. 2) of the catch ring 4. By exerting a pull on said bolt 34, the latter disengages the teeth 35, thereby releasing the adaptor 4.

In the embodiment shown in FIG. 3, no separate head is provided, the head ring being formed by the plastic covering 22a of the die stock head 1a. Catch ring 4a is pushed into an opening 36 of the plastic covering 22a of the die stock head 1a. The lip 37 of the plastic covering remote from the cutting helix runs approximately at right angles to the axis A of the die stock head 1a. A collar 29a at the forward end 38 of the catch ring 4 has an outwardly projecting peripheral bead 39 for cooperation with a complementarily formed groove 40 in the inner wall 41 of the opening 36, the catch connection 39, 40 serving to secure the catch ring 4a axially relative to the die stock head 1a.

That end of the catch ring 4a remote from the cutting head 6 is provided on its outer wall 30a with a peripheral shoulder 31a the radial face of which abuts that side face 32 of lip 37 which is turned towards the cutting head 6.

The inner peripheral face 43 of lip 37 engages the axially directed face of the shoulder.

The cutting die stock shown in FIG. 3 is formed substantially the same as the die stock of FIGS. 1 and 2.

To the catch ring 4a, smaller cutting heads of a size up to, for example, one and one quarter inches are fixed in the stock head 1a. Larger cutting heads of, for example, one and one half inches and two inches are inserted directly into the die stock head 1a without the use of the catch ring 4a. The opening 36 is again so designed that the larger cutting heads can be held securely in the die stock head. The cutting heads are held against axial displacement in the opening 36 of the die stock head 1a in like manner to that shown in FIG. 2 by means of a spring ring or snap ring 27. A bead corresponding to the peripheral bead 39 of the catch ring 4 is, in this case, not necessary. Corresponding to the aforedescribed embodiment the larger cutting head then lies on the inner peripheral face 41 of the opening 36 and on the front face 38 of the lip 37.

Also as with the previously described embodiment, it is possible to insert in one and the same die stock head smaller cutting heads using the catch ring 4a and larger cutting heads directly in the opening 36 of the die stock head 1a, and to secure the cutting head relative to the die stock head. Due to the use of a single thread cutting die stock for cutting heads of different sizes there result advantages from the manufacturing point of view because, for the larger cutting heads having a size of one and one half inches and two inches, no special thread cutting die stocks have to be made. In addition, storage costs are considerably reduced. It is also of great advantage in that, for example, only a single thread cutting die stock will have to be taken along to the building site.

Figure 4:
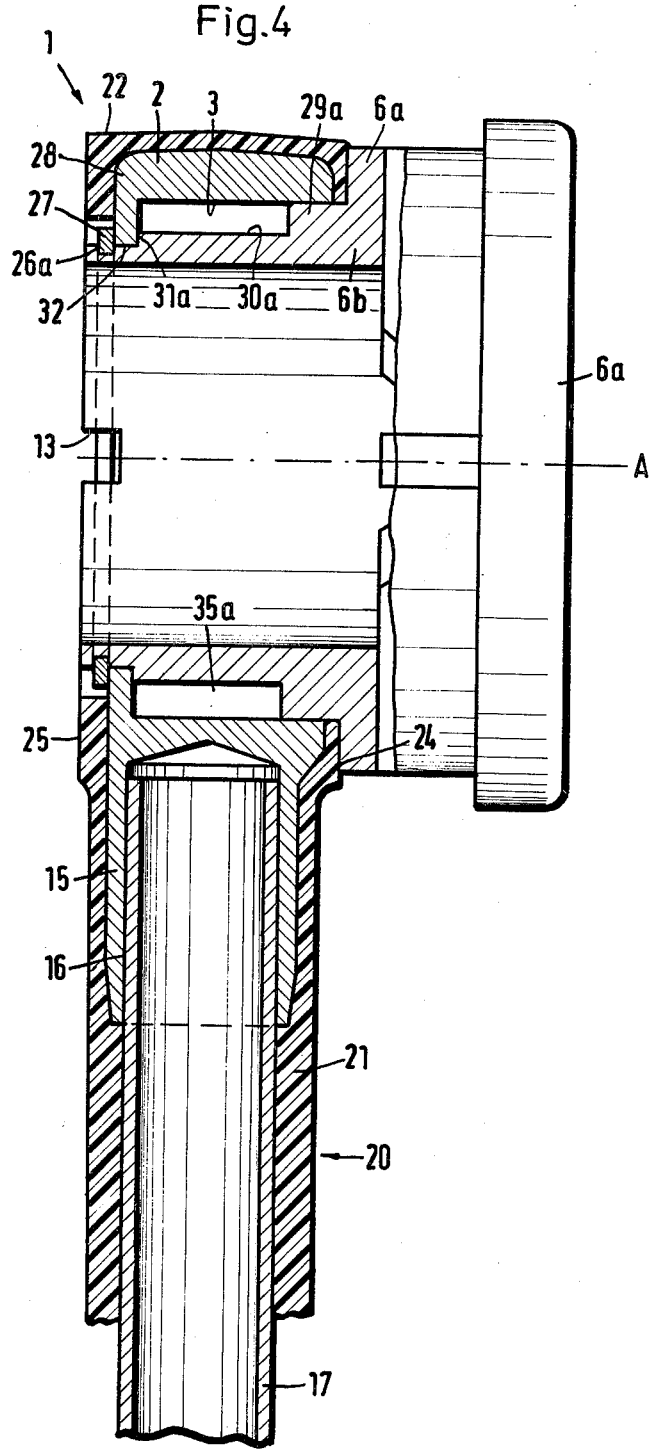
FIG. 4 represents a section corresponding to that of FIG. 2 but with a larger cutting head inserted in the thread cutting die stock without the catch ring.

The catch ring 4 according to FIG. 4 has an outer tooth means 35 into which the arresting bolt 34 engages. The thread cutting head 6 with an extension piece 44 is inserted in the receiving bore 5 of the catch ring 4. The receiving bore 5 has a hexagonal outline (compare FIG. 1) relative to which the periphery of the extension piece 44 is adapted or matched. The holding of the catch ring 4 in the die stock head 1 and the cutting head 6 in the catch ring 4 are illustrated in FIGS. 1 and 2 and the descriptive portion belonging therewith.

The larger cutting head 6a according to FIGS. 4 and 6 is inserted with its extension piece 44A directly in the receiving bore 3 of the die stock head 1. The extension piece 44a in a known manner has an outer tooth means 35A into which the arresting bolt 34 engages.

FIG. 7 shows the engagement of the latching bolt 34 in the outer tooth means 35 of the catch ring 4. The arresting bolt 34 is loaded under the force of a pressure spring 45 byassing the arresting bolt in a direction toward the catch ring 4.

The free end 46 of the arresting bolt 34 is so embodied that the arresting bolt during turning of the die stock arm 20 in a direction 47 takes along the catch ring 4 and accordingly takes along the cutting head inserted therein, though turning of the die stock head counter to the arrow 47 slippage occurs over the teeth of the outer tooth means 35 so that the catch ring 4 is not taken along. The thread cutting die stock accordingly is embodied as a ratchet die stock.

It is, of course, to be understood that the present invention is, by no means, limited to the specific showing in the drawings, but also comprises any modifications within the scope of the appended claims.

What I claim is:

1. A thread cutting die stock which includes in combination: a die stock head structure having an axis, an abutment surface, and a bore with a first inner guiding surface for detachably receiving one of a first cutting head or an adaptor which has a second bore with an annular groove about the inner wall thereof, and a resilient fastener means in said groove, a securing means engaging one of said first cutting head or said adaptor and said abutment for securing same to said head, a second cutting head for mounting in said second bore and having securing means for engagement with said resilient fastener means in said annular groove, whereby either said first cutting head is secured in said die stock head or said second cutting head is secured in said die stock head by mounting said second cutting head in said adaptor secured in said die stock head.

2. A die stock in combination according to claim 1, in which said die stock head structure includes an insert comprising said first inner guiding surface.

3. A die stock in combination according to claim 2, in which said insert includes an extension extending transverse to the axis of said adaptor and engaging the latter for preventing accidental axial displacement of said adaptor.

4. A die stock in combination according to claim 3, which includes securing means secured in said adaptor and engaging the outside of said extension.

* * * * *